United States Patent [19]
Gerloff

[11] Patent Number: 5,725,703
[45] Date of Patent: Mar. 10, 1998

[54] METHOD FOR PLACING A TREAD STRIP, CUT TO THE REQUIRED LENGTH FROM A QUASI-CONTINUOUS TREAD STRIP BAND SPLICED FROM TREAD STRIP PORTIONS, ONTO A BELT BUILDING DRUM

[75] Inventor: Klaus Gerloff, Isernhagen, Germany

[73] Assignee: Continental Aktiengesellschaft, Hanover, Germany

[21] Appl. No.: 459,120

[22] Filed: Jun. 2, 1995

[30] Foreign Application Priority Data

Jun. 4, 1994 [DE] Germany .......... 44 19 645.8

[51] Int. Cl.⁶ .................................. B29D 30/30
[52] U.S. Cl. .......... 156/130; 156/266; 156/304.1; 156/406.4
[58] Field of Search .......... 156/405.1, 406.4, 156/130, 128.6, 304.1, 264, 265, 266

[56] References Cited

U.S. PATENT DOCUMENTS 2,902,082  9/1959  Watson et al. .......... 156/405.1
3,867,228  2/1975  Brinkley et al. .......... 156/406.4
3,874,974  4/1975  Simmons, Jr. .......... 156/406.4
4,877,468  10/1989  Siegnethaler .......... 156/133
5,049,222  9/1991  Irie .......... 156/406.4

*Primary Examiner*—Geoffrey L. Knable
*Attorney, Agent, or Firm*—Robert W. Becker and Associates

[57] ABSTRACT

In a method for placing the required length of a tread strip onto a belt building drum tread strip portions are prepared by cutting from a continuous tread strip supply. The tread strip portions are collected in a storage device. The tread strip portions are sequentially fed to a belt building drum such that in a direction of feeding to the rear edge of a leading strip the leading edge of the next tread strip portion is spliced and a quasi-continuous tread strip band is formed. The circumference of the belt building drum is determined in order to determine the required tread strip length. The quasi-continuous tread strip band is cut to the required length of the tread strip so as to match the circumference of the belt building drum.

4 Claims, 1 Drawing Sheet

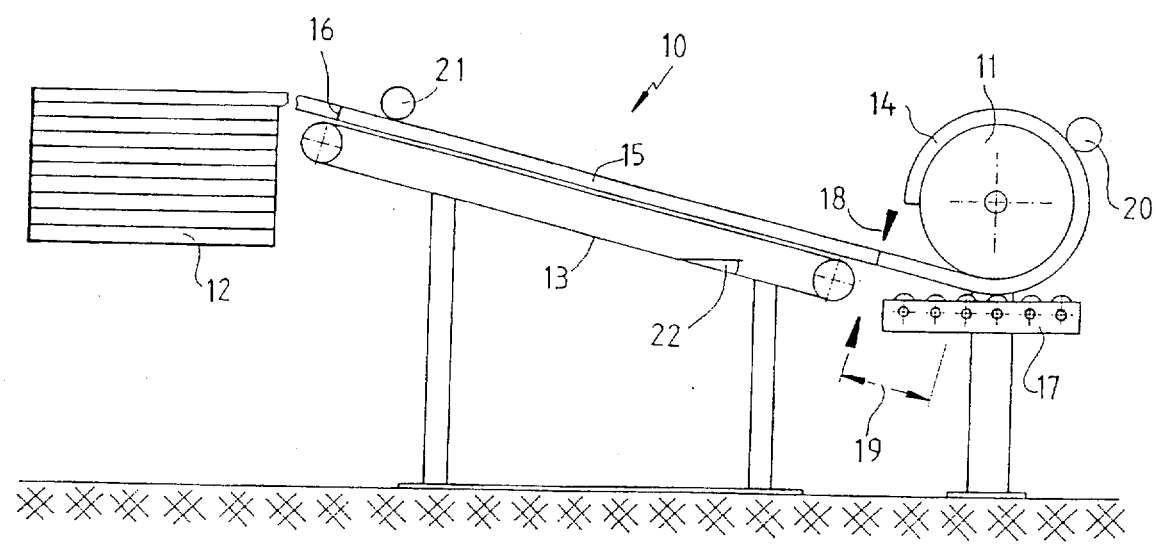

5,725,703

METHOD FOR PLACING A TREAD STRIP, CUT TO THE REQUIRED LENGTH FROM A QUASI-CONTINUOUS TREAD STRIP BAND SPLICED FROM TREAD STRIP PORTIONS, ONTO A BELT BUILDING DRUM

BACKGROUND OF THE INVENTION

The present invention relates to a method for determining the respectively required tread strip length and placing the tread strip on a belt building drum. Tread strip portions of a certain length are fed from a storage device to the belt building drum via a coordinated conveyor belt, and the required tread strip length to be placed onto the belt building drum is cut to length with a cutting knife.

For producing tread strips for passenger vehicle tires, the tread strip portion are cut to length and stored on a storage carriage. With this storage carriage the tread strip portion can then be transported to the belt building drum.

Due to the continuing building of the belt ply package, fluctuations in the actual diameter of the belt building drum occur necessarily. The actual required length of the tread strip material must thus be adjusted and the tread strip material must be cut to length accordingly. The use of precut tread strip portions has the advantage of relative flexibility. However, this method affects the uniformness of the tire. Since the length of the tread strip portions does not correspond to the actual external diameter of the belt ply package, the tread strip portions to be applied to the drum must be either stretched or compressed during winding onto the belt building drum in the area of the splice. This results in a non-uniform material distribution of the tread strip over the circumference.

When relatively long and heavy tread strip portions, as used especially for the manufacture of truck tires, are used, the tread strip portion is folded at its center upon placing it onto the support of the tread strip servicer and is subsequently unfolded upon removal therefrom. This may cause thinner areas within the portion that has been folded which may result in a non-uniform mass distribution over the circumference of the tire.

In another method an endless extruded tread strip band is wound into a reel for storage in order to be used for a plurality of tires. The tread strip band is transported on this reel.

Such reels, however, are difficult to manipulate. Also, considerable investments are required in order to retrofit already existing facilities for use with such large reels. A further problem is that the material on such reels tends to sag when positioned with its axis in a horizontal position. The tread strip material is thus loose in the lower portion of the reel, while it is compressed in the upper portion. This results in non-uniformness of the tread strip material which is noticeable with respect to the trueness of the finished tire.

It is therefore an object of the present invention to provide a method with which the actual required tread strip length can be determined and cut to length as a function of the actual belt building drum diameter.

SUMMARY OF THE INVENTION

The method for placing a tread strip of the required length onto a belt building drum according to the present invention is primarily characterized by:

Preparing by cutting tread strip portions from a continuous tread strip supply;

Collecting the tread strip portions in a storage device;

Feeding sequentially the tread strip portions to a belt building drum such that, in a direction of feeding, to the rear edge of a leading tread strip portion the leading edge of the next tread strip portion is spliced and a quasi-continuous strip band is formed.

Determining the required length of the tread strip to be applied to the belt building drum according to a size parameter of the belt building drum; and Cutting the quasi-continuous tread strip band to the required length.

Preferably, the method further comprises the step of winding the quasi-continuous tread strip band onto the belt building drum before the step of cutting.

Alternatively, the method further comprises the step of winding the tread strip onto the belt building drum after the step of cutting.

Preferably, the step of preparing includes the step of cutting the tread strip portions to a length of substantially half the required length of the tread strip.

According to the present invention, precut tread strip portions, preferably cut to a length that corresponds substantially to half the required length of the tread strip, are provided within a storage device and placed onto the conveyor belt whereby the rear edge of the leading tread strip portion is spliced to the leading edge of the following tread strip portion so that the complete length of the tread strip material on the conveyor belt corresponds to more than the required length of the tread strip. The actual required tread strip length is determined with a measuring device by measuring the actual diameter or circumference of the belt building drum. The required length of tread strip material is cut from the quasi-continuous tread strip band with a cutting knife. However, it is also possible that the quasi-continuous tread strip band, resulting from splicing the tread strip portions, is first wound onto the belt building drum and is subsequently cut to length.

With the inventive measures a quasi-endless or continuous tread strip band is produced. Transporting and feeding such an endless tread strip band is substantially simpler than that of endless wound tread strip band material (reels of tread strip bands). Thus, the advantages of endless material can be exploited without needing the otherwise required devices at the extruder and winding machines. Furthermore, it is possible to use the inventive method only for specialty tires without having to change the infrastructure of the entire production facility because the remaining tire production can remain untouched.

The invention has furthermore the object to provide a device for performing the aforementioned method.

This is achieved by employing a quasi-continuous tread strip band comprised of tread strip portions spliced together before winding the tread strip material onto the belt building drum.

With this measure, a device is provided with which the actually required length of the tread strip material can be varied and cut to length according to the respective drum diameter.

BRIEF DESCRIPTION OF THE DRAWINGS

The object and advantages of the present invention will appear more clearly from the following specification in conjunction with the accompanying drawing, in which a winding and cutting device for tire production is schematically represented.

DESCRIPTION OF PREFERRED EMBODIMENTS

The winding and cutting device 10 represented in the only Figure is comprised substantially of a belt building drum 11 and a storage device in the form of storage carriage 12 between which a conveyor belt 13 is arranged. The belt building drum 11 has coordinated therewith at a predetermined distance 19 a cutting knife 18 with which the tread strip material, already partially wound onto the belt building drum 11, is cut to the required length such that the beginning and the end of the tread strip material 14 abut to form a splice.

For determining the actual required length of the tread strip material to be applied to the belt building drum 11, while still resting as a tread strip band 15 on the conveyor belt 13, a measuring device 20, for example in the form of a measuring wheel, is provided. With this measuring device 20 the actual diameter of the belt building drum 11, onto which other belt plies may already be placed so that the diameter of belt building drum can vary due to the presence of belt plies, is determined.

A further measuring device 21 is coordinated with the conveyor belt 13. This measuring device 21 controls the cutting knife 18 which cuts the tread strip band 15 resting on the conveyor belt 13 to the length that has been determined by the first measuring device 20.

The free end of the conveyor belt 13 adjacent to the belt building drum 11 is provided with a support 17 opposite the cutting knife 18. The support 17 can be, for example, in the form of a roller arrangement or a table in order to allow for an easy application of the cut-to-length tread strip material 14 onto the belt building drum 11.

The conveyor belt 13 is positioned at an angle 22 of approximately 30° to the horizontal. The cutting knife 18 is positioned at a predetermined distance 19 relative to the belt building drum 11. This distance 19 should be as short as possible.

The tread strip portions to be spliced to form the band 15 are cut to a length that is smaller than the circumference of the belt building drum 11. Preferably, the length is approximately ½ of the drum circumference. The tread strip portions are transported on a storage carriage 12 for further processing and are spliced on the conveyor belt 13 with a splice 16 to form the quasi-continuous tread strip band 15. This quasi-continuous tread strip band 15 can then be cut to length with the cutting knife 18 correlated with the belt building drum 11. The support 17 for the cut-to-length tread strip material 14 is provided in the form of a roller arrangement or a table.

The present invention is, of course, in no way restricted to the specific disclosure of the specification and drawings, but also encompasses any modifications within the scope of the appended claims.

What I claim is:

1. In a method for placing a tread strip of the required length onto a belt building drum; the improvement comprising the steps of:

preparing by cutting tread strip portions to a length that is smaller than the circumference of the belt building drum from a continuous tread strip supply;

collecting the tread strip portions in a storage device;

feeding sequentially the tread strip portions to the belt building drum and forming a quasi-continuous tread strip band by splicing, in a direction of feeding, the rear edge of a leading tread strip portion to the leading edge of the next tread strip portion;

determining the required length of the tread strip to be applied to the belt building drum according to a size parameter of the belt building drum; and cutting said quasi-continuous tread strip band to said required length.

2. A method according to claim 1, further comprising the step of winding said quasi-continuous tread strip band onto the belt building drum before said step of cutting to said required length.

3. A method according to claim 1, further comprising the step of winding the tread strip onto the belt building drum after said step of cutting to said required length.

4. A method according to claim 1, wherein the step of preparing includes the step of cutting the tread strip portions to a length of substantially half the required length of the tread strip.

* * * * *